No. 894,070. PATENTED JULY 21, 1908.
B. SCHWERIN.
EXTRACTION OF WATER OR OTHER LIQUID FROM MINERAL, VEGETABLE, AND ANIMAL SUBSTANCES.
APPLICATION FILED JUNE 27, 1905.
Fig: 1.
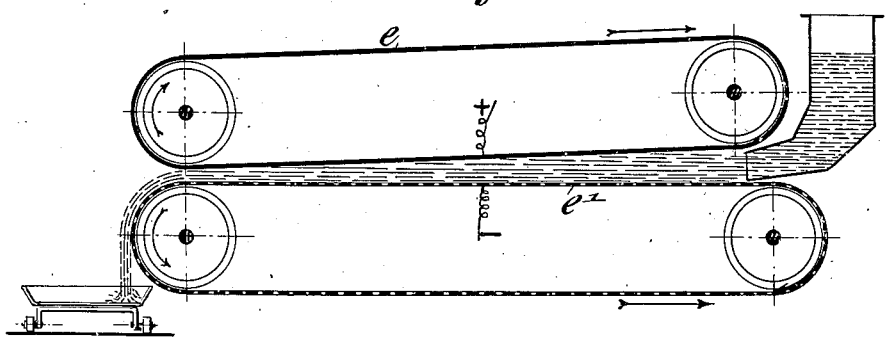
Fig: 2.
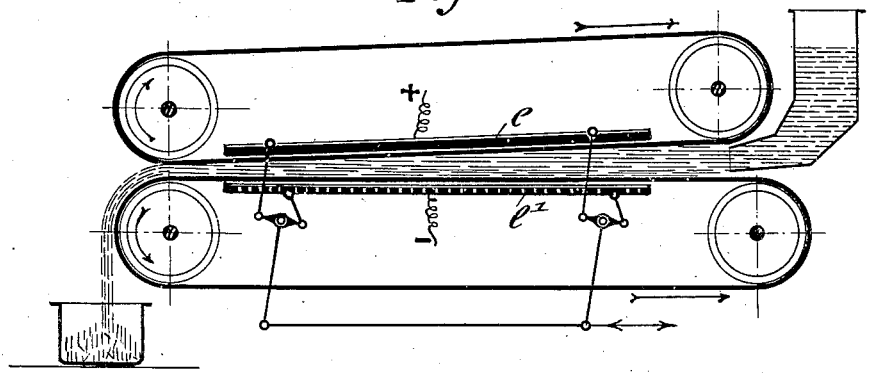

UNITED STATES PATENT OFFICE.

BOTHO SCHWERIN, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

EXTRACTION OF WATER OR OTHER LIQUID FROM MINERAL, VEGETABLE, AND ANIMAL SUBSTANCES.

No. 894,070.   Specification of Letters Patent.   Patented July 21, 1908.

Application filed June 27, 1905. Serial No. 267,228.

*To all whom it may concern:*

Be it known that I, BOTHO SCHWERIN, doctor of laws and chemist, a subject of the King of Prussia, Emperor of Germany, residing at Höchst-on-the-Main, Germany, have invented certain new and useful Improvements in the Extraction of Water or other Liquid from Mineral, Vegetable, and Animal Substances, of which the following is a specification.

According to a known method whereby water or other liquid is extracted from mineral, vegetable or animal substances by electro-osmosis, the material, for instance peat pulp, is introduced into a box of which the bottom is perforated and used as cathode, while the anode rests like a lid on the material contained in the box. As soon as sufficient water is extracted by the action of the current, the boxes or frames are emptied and subsequently refilled. The apparatus described in United States Patent 720,186, February 10, 1903 also consists of a number of such boxes or frames to be filled or emptied at every operation. This, however, signifies increase of work and consequently reduced production Endeavors have, therefore, been made to render the electro-osmotic extraction a continuous one by causing the supply of fresh material and the removal of the extracted product to occur uninterruptedly during electro-osmosis.

A continuous extraction has already been described in United States Patent No. 670,351, March 19, 1901 wherein the electrodes consist of two co-axial metal cylinders between which the material is caused to travel by a rotary conveyer. An objection to such an apparatus is that by the continuous mixing of the peat, the effect of the osmotic extraction is partly neutralized and if a high degree of dryness is wanted the material becomes so hard as to render its passage between the electrodes impossible.

By this invention the electro-osmotic extraction is a continuous one by causing the material to be extracted to travel with or between the electrodes in such a manner as to avoid its becoming mixed. The material is set in motion uninterruptedly or periodically and in proportion with the forward movement the fresh material is supplied from one side and dry material delivered at the opposite side. The material to be extracted passes between the electrodes in such a manner as to avoid any mixing of the same and any mechanical interruption of the electro-osmotic extraction, so as to facilitate the process to a high degree.

In the accompanying drawing, Figures 1 and 2 represent vertical longitudinal sections of two apparatus for carrying out my improved process of extracting water or other liquid from mineral, vegetable and animal substances.

Similar letters of reference indicate corresponding parts in the two figures of the drawing.

The process may be carried out in various manners. It is preferable, however, to set the material in motion simultaneously with at least one of the electrodes between which it travels and in the latter case with the electrode where the liquid escapes, generally the negative one. The electrodes serve here also as a conveyer of the material to be extracted. For this purpose the electrodes (compare Fig. 1 $e$, $e'$) consist of parallel or slightly inclined endless bands or strips, similarly to conveying bands which continuously carry with them the material to be extracted and finally deliver it. The lower electrode—in the Figs. 1 and 2 the cathode—where the liquid escapes, is generally permeable, while the positive, owing to its slanting position, relatively to the former athode, is gently pressed against the material so as to insure a good contact.

Non-conductive cross or longitudinal laths or frames may be fixed on the electrodes to keep very liquid material from running off. The pressure may be continuous or intermittent as required. Also one or both poles may be heated. Of the two electrodes forming endless bands or strips, only one need be of a forwarding motion, usually the negative, while the second electrode, generally the positive, may be fixed, yet in such a manner, as to be raised from the material at every forward movement and resting like a lid when the apparatus stands still. The material may be protected against the chemical action of the current by introducing between the electrodes and the material pervious non-conductors, such as cloth and the like.

The heating of the poles and material, the application of intermittent pressure having proved satisfactory in the electro-osmotic extraction may of course be made use of in this process.

Having now described my invention, what I claim is:—

1. The herein described process for extracting water and other liquid from mineral, vegetable and animal substances in a continuous manner by electro-osmosis, which consists in causing the material to be treated, by the electric current to pass between the electrodes in such a manner as to avoid any mixing of the material.

2. The herein described process for extracting water and other liquid from mineral, vegetable and animal substances in a continuous manner by electro-osmosis, which consists in causing the material to be treated by the electric current to pass between the electrodes in such a manner as to avoid any mixing of the material, both electrodes being endless metallic traveling bands which slightly press against the material for making a contact and which uniformly and continuously move forward, while fresh material is continuously supplied from one side and dry material delivered at the opposite side.

3. The herein described process for extracting water and other liquid from mineral, vegetable and animal substances in a continuous manner by electro-osmosis, which consists in causing the material to be treated by the electric current to pass between the electrodes in such a manner as to avoid any mixing of the material, both electrodes being endless metallic traveling bands which slightly press against the material for making a contact and which move forward periodically, supplying fresh material from one side and delivering dry material at the opposite side, according as they move forward.

4. The herein described process for extracting water and other liquid from mineral, vegetable and animal substances in a continuous manner by electro-osmosis, which consists in causing the material to be treated by the electric current to pass between the electrodes in such a manner as to avoid any mixing of the material, the negative electrode being an endless metallic traveling band which periodically moves forward and supplies fresh material from one side and delivers dry material at the opposite side, according as it moves forward, the positive electrode being movable in an almost vertical direction to the direction of the movement of the negative electrode, which during the standstill of the negative electrode is put like a lid on the material for making a contact, and taken off while the material is moving forward.

In testimony, that I claim the foregoing as my invention, I have signed my name in presence of two subscribing witnesses.

BOTHO SCHWERIN.

Witnesses:
   JOHANNES OSOHLICS,
   M. HANNKE.